US010330159B2

United States Patent
Yu et al.

(10) Patent No.: US 10,330,159 B2
(45) Date of Patent: Jun. 25, 2019

(54) ELECTROMAGNETIC DOG CLUTCH

(71) Applicant: Jing-Jin Electric Technologies Co., Ltd., Beijing (CN)

(72) Inventors: Ping Yu, Beijing (CN); Ting Wang, Beijing (CN); Xiao Ye, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 15/575,975

(22) PCT Filed: Jan. 20, 2017

(86) PCT No.: PCT/CN2017/071847
§ 371 (c)(1),
(2) Date: Nov. 21, 2017

(87) PCT Pub. No.: WO2017/193636
PCT Pub. Date: Nov. 16, 2017

(65) Prior Publication Data
US 2018/0149210 A1    May 31, 2018

(30) Foreign Application Priority Data
May 12, 2016 (CN) .......................... 2016 1 0316899

(51) Int. Cl.
*F16D 27/118*    (2006.01)
*F16D 27/14*    (2006.01)
(Continued)

(52) U.S. Cl.
CPC ............ *F16D 27/118* (2013.01); *F16D 11/14* (2013.01); *F16D 27/14* (2013.01);
(Continued)

(58) Field of Classification Search
CPC .. F16D 27/118; F16D 11/14; F16D 2011/008; F16D 43/2024; F16D 27/09
See application file for complete search history.

(56) References Cited

U.S. PATENT DOCUMENTS 2,011,629 A * 8/1935 Hahnemann ............ F16D 11/04
192/108
2,437,207 A * 3/1948 Noxon .................... F16D 11/14
192/108
(Continued)

FOREIGN PATENT DOCUMENTS

| CN | 202125542 U | 1/2012 |
| CN | 202441760 U | 9/2012 |

(Continued)

OTHER PUBLICATIONS

The State Intellectual Property Office of the People's Republic of China, Office Action in Chinese Patent Application No. 201610316899.7 dated Aug. 31, 2017.
(Continued)

*Primary Examiner* — Stacey A Fluhart
(74) *Attorney, Agent, or Firm* — LKGlobal | Lorenz & Kopf, LLP

(57) ABSTRACT

This Application pertains to an electromagnetic dog clutch, including a movable gear sleeve and a fixed toothed sleeve that are engaged to transmit power. The movable gear sleeve is provided with contrate transmission teeth or tooth spaces, and the fixed toothed sleeve is correspondingly provided with contrate tooth spaces or transmission teeth. The transmission teeth have a uniform thickness in a direction of tooth length, tooth spaces that engage with the transmission teeth have a sector-shape in a direction of tooth space length, and the width of two sides of the tooth spaces gradually increases outwardly along the radial direction of the fixed toothed sleeve and gradually decreases inwardly along the radial (Continued)

direction of the fixed toothed sleeve. By employing the engagement of transmission teeth of uniform thickness and sector-shaped tooth spaces, the transmission teeth can more easily engage with the tooth spaces, and more easily realize surface contact.

9 Claims, 6 Drawing Sheets

(51) Int. Cl.
  *F16D 11/14* (2006.01)
  *F16D 43/202* (2006.01)
  *F16D 11/00* (2006.01)
  *F16D 27/00* (2006.01)

(52) U.S. Cl.
  CPC .... *F16D 43/2024* (2013.01); *F16D 2011/008* (2013.01); *F16D 2027/007* (2013.01); *F16D 2027/008* (2013.01)

(56) References Cited

U.S. PATENT DOCUMENTS

| | | | | |
|---|---|---|---|---|
| 2,724,474 A * | 11/1955 | Hupp | ............... | F16D 27/09 188/69 |
| 3,084,776 A * | 4/1963 | Rabinow | ............... | F16D 11/14 192/109 R |
| 3,091,316 A | 5/1963 | Huffman | | |
| 4,566,566 A * | 1/1986 | Vuillet | ............... | D03C 1/16 139/1 E |
| 5,140,206 A | 8/1992 | Hasegawa et al. | | |
| 5,150,779 A * | 9/1992 | Booth | ............... | F16D 27/112 192/200 |
| 5,586,455 A * | 12/1996 | Imai | ............... | D06F 37/40 68/12.02 |
| 8,348,041 B2 * | 1/2013 | Elliott | ............... | F16D 11/14 192/108 |
| 8,499,915 B2 * | 8/2013 | Harrison | ............... | F16D 11/14 192/55.2 |
| 2010/0232875 A1 * | 9/2010 | Cunningham | ............... | F01D 5/025 403/364 |
| 2013/0230352 A1 * | 9/2013 | Goulet | ............... | A01B 71/06 403/364 |

FOREIGN PATENT DOCUMENTS

| | | | | |
|---|---|---|---|---|
| CN | 103758889 A | 4/2014 | | |
| CN | 104806655 A | 7/2015 | | |
| CN | 105864315 A | 8/2016 | | |
| CN | 205841559 U | 12/2016 | | |
| GB | 361027 A * | 11/1931 | ............ | F16D 11/10 |
| JP | 349127657 U | 11/1974 | | |
| JP | 354141941 A | 11/1979 | | |
| JP | 2004332825 A | 11/2004 | | |
| JP | 2005036834 A | 2/2005 | | |
| JP | 2006077828 A | 3/2006 | | |

OTHER PUBLICATIONS

International Bureau of WIPO, International Search Report and Written Opinion in Application No. PCT/CN2017/071847 dated Apr. 17, 2017.

* cited by examiner

ELECTROMAGNETIC DOG CLUTCH

CROSS-REFERENCE TO RELATED APPLICATION

This application is a U.S. National-Stage entry under 35 U.S.C. § 371 based on International Application No. PCT/CN2017/071847, filed Jan. 20, 2017, which was published under PCT Article 21(2) and which claims priority to Chinese Patent Application No. 201610316899.7, filed May 12, 2016, which are all hereby incorporated in their entirety by reference.

TECHNICAL FIELD

This application pertains to an electromagnetic dog clutch, and particularly relates to transmission tooth structure of electromagnetic dog clutches and centering structure of movable gear sleeves.

BACKGROUND

Some new energy automobile models comprise engine, electrical motor and transmission, so the space for entire vehicle layout is highly limited. A power on-off mechanism is necessarily required in order to reduce oil consumption, increase system efficiency, optimize control strategy and realize switching between different working modes. However, as traditional clutches comprise pressing plate, driven disk, diaphragm spring, release bearing, rocker, servomechanism etc., they have a large number of parts and components, a heavy weight as well as many invalidation points, and are hard to maintain.

It is disclosed in the prior art that electromagnetic dog clutches can replace traditional clutches. For example, a Chinese patent application of invention titled "Electromagnetic Toothed Clutch And Double-Motor Hybrid System" (application number: 201310741008.9) discloses an electromagnetic dog clutch, which is provided with a movable contrate gear and a fixed contrate gear (which may also be referred to as movable gear sleeve and fixed toothed sleeve). Under the attraction of the electromagnet the movable contrate gear engages with the fixed contrate gear and realizes inter-shaft transmission. The teeth of the movable contrate gear are rectangular, the tooth spaces of the fixed contrate gear are also rectangular, and the width of the tooth spaces are greater than that of the teeth, which facilitates the teeth entering the tooth spaces. The use of rectangular transmission teeth can improve the anti-interference ability of the system when the centering is not good, and can also promote the ability of torque transmission between contrate gears.

However, rectangular transmission teeth and tooth spaces have a defect that it is difficult to align and engage correctly, which will result in late clutching or invalidation of the clutch. Additionally, since the width of the tooth spaces are greater than that of the teeth, the engagement process has a defect that the teeth and the tooth spaces only in line contact and cannot completely realize surface contact.

As the movable contrate gear moves in the axis direction of the power output shaft and engages with the fixed contrate gear in the coaxial direction, after long time operation of the system, under the influence of wear or assembling relations, there will be a problem that the movable contrate gear cannot keep coaxial with the fixed contrate gear, which also results in late clutching or failure of the clutch.

In the above patent application, the clutch is also provided with an elastic resetting mechanism for resetting the movable contrate gear, to urge the movable contrate gear and the fixed contrate gear to separate. The elastic resetting mechanism comprises a positioning plate and a spring, the positioning plate is fixed to the end of the power output shaft, and the spring is located between the positioning plate and the movable contrate gear. When attracted by the electromagnet, the movable contrate gear moves towards the fixed contrate gear and compresses the spring; if the attraction of the electromagnet disappears, under the effect of the restoring force of the spring, the movable contrate gear moves away from the fixed contrate gear. As the attractive force of the electromagnet is generated instantly, the moving speed of the movable contrate gear is usually high, and thus it will drastically collide with the positioning plate and generate a remarkable system noise. Although a preloaded spring between them can provide a certain cushioning, the elastic modulus of the spring cannot be so high, otherwise the engagement between the movable contrate gear and the fixed contrate gear will be affected. Therefore, the cushioning effect of the spring is very weak, and cannot obviously reduce the system noise. In addition, other objects, desirable features and characteristics will become apparent from the subsequent summary and detailed description, and the appended claims, taken in conjunction with the accompanying drawings and this background.

SUMMARY

In view of the above problems, this application aims to provide an electromagnetic dog clutch which makes improvements on the structure of contrate transmission teeth to facilitate the engagement and transmission between the movable contrate gear and the fixed contrate gear. The clutch also makes improvements in centering and system noise reduction of the movable contrate gear.

In order to achieve the above objects, this application adopts the following technical solutions:

An electromagnetic dog clutch, comprising a movable gear sleeve and a fixed toothed sleeve that are engaged to transmit power, the movable gear sleeve is provided with contrate transmission teeth or tooth spaces, and the fixed toothed sleeve is correspondingly provided with contrate tooth spaces or transmission teeth; the transmission teeth have a uniform thickness in a direction of tooth length, tooth spaces that engage with the transmission teeth have a sector-shape in a direction of tooth space length, and the width of two sides of the tooth spaces gradually increases outwardly along the radial direction of the fixed toothed sleeve and gradually decreases inwardly along the radial direction of the fixed toothed sleeve.

Optionally, the transmission teeth are rectangular teeth, inverted-cone-shaped teeth, trapezoidal teeth, triangular teeth or circular-arc-shaped teeth, and correspondingly, the tooth spaces are rectangular tooth spaces, inverted-cone-shaped teeth spaces, trapezoidal teeth spaces, triangular teeth spaces or circular-arc-shaped teeth spaces.

Optionally, when the transmission teeth are rectangular teeth, inverted-cone-shaped teeth or trapezoidal teeth, two sides of a tooth crest are configured to be a fillet, and the fillet radius in a reverse rotation direction of the movable gear sleeve or the fixed toothed sleeve is greater than the fillet radius in a positive rotation direction.

Optionally, the movable gear sleeve is nested on a power output shaft, they transmit power through by a spline group, and the movable gear sleeve reciprocating moves on the spline in an axis direction of the power output shaft.

Optionally, at two ends of the spline group, a centering sleeve is provided between the movable gear sleeve and the power output shaft; the centering sleeve is made of copper alloy material, has a rectangular cross-section, is positioned with respect to the movable gear sleeve with an interference fit, is clearance fitted with the power output shaft, and supports the movable gear sleeve to slide on the power output shaft.

Optionally, a limiting plate is fixed at one end of the power output shaft where the movable gear sleeve is amounted, a damping mechanism is provided between the limiting plate and the movable gear sleeve, and the damping mechanism absorbs shock and reduces noise when the limiting plate and the movable gear sleeve collide.

Optionally, several blind holes are provided on fitting surfaces between the movable gear sleeve and the limiting plate, rubber columns are installed in the blind holes, the rubber columns protrude from the blind holes and constitute the damping mechanism.

Optionally, a rubber gasket is provided on fitting surfaces between the movable gear sleeve and the limiting plate, and the rubber gasket constitutes the damping mechanism.

Optionally, the fixed toothed sleeve is circumferentially provided with an electromagnet, and correspondingly the movable gear sleeve is circumferentially provided with an armature, wherein the armature and the movable gear sleeve are manufactured integrally, or manufactured separately and then combined.

Optionally, the armature and the movable gear sleeve are manufactured separately and then combined by welding or using a bolt, and the armature is made of No. 10 steel.

The electromagnetic dog clutch employing the above structure configurations has the following advantages:

By employing the engagement of transmission teeth of uniform thickness and sector-shaped tooth spaces, the transmission teeth can more easily engage with the tooth spaces, and more easily realize surface contact, which facilities moment transmission and facilities the stability of the transmission structure.

The clutch is provided with the centering sleeve for the movable gear sleeve (or the movable contrate gear) that reciprocating moves, and the centering sleeve can maintain concentricity between the movable gear sleeve and the power output shaft for a long time, and also maintain concentricity between the movable gear sleeve and the fixed toothed sleeve for a long time.

The centering sleeve may be made of copper alloy material, such as tin bronze or graphite-brass composite, and has good wear resistance and deformation resistance.

The clutch is provided with the damping mechanism for the limiting plate, by providing the rubber columns or the rubber gasket between the limiting plate and the movable gear sleeve. When combined under electromagnetic force, the rubber columns or the rubber gasket is compressed first and serves as cushioning, to significantly reduce the noise of the combining.

The above description is merely an overview of technical solutions of this application. In order to more apparently understand the technical solutions of this application and implement them in accordance with the contents of specification, and to more readily understand above and other objectives, features and advantages of this application, particular embodiments of this application are provided hereinafter.

BRIEF DESCRIPTION OF DRAWINGS

The present invention will hereinafter be described in conjunction with the following drawing figures, wherein like numerals denote like elements, and.

Figure 1:
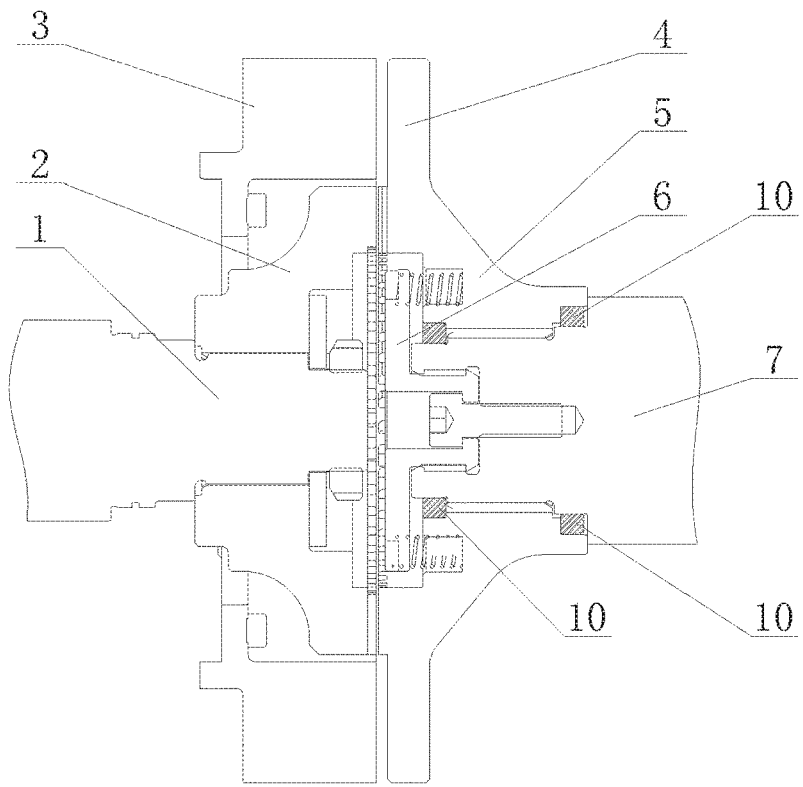
FIG. 1 is a schematic diagram of the overall structure of this application.

In the drawings: 1, power input shaft; 2, fixed toothed sleeve; 2-1, tooth spaces; 3, electromagnet; 4, armature; 5, movable gear sleeve; 5-1, transmission teeth; 5-2, internal spline; 5-3, snap slots; 6, limiting plate; 7, power output shaft; 8, rubber columns; 9, spring; 10, centering sleeve; and 11, rubber gasket.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Exemplary embodiments of this application will be described in more detail below with reference to the accompanying drawings. Although the accompanying drawings display the exemplary embodiments of this application, it should be understood that this application may be implemented in various forms and not limited by the embodiments set forth herein. Instead, these embodiments are provided to facilitate those skilled in the art more thoroughly understand this application, and completely convey the scope of this application to them.

First Embodiment

Figure 2:
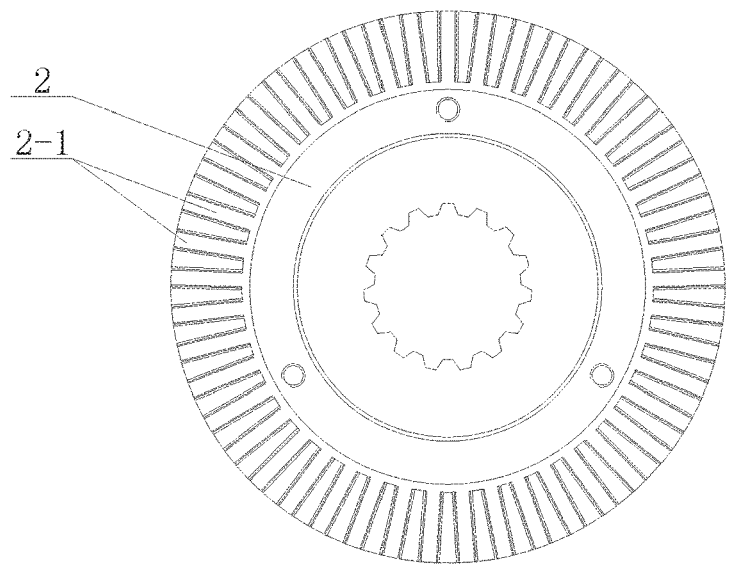
FIG. 2 is a schematic diagram of the structure of the fixed toothed sleeve of this application.
Figure 3:
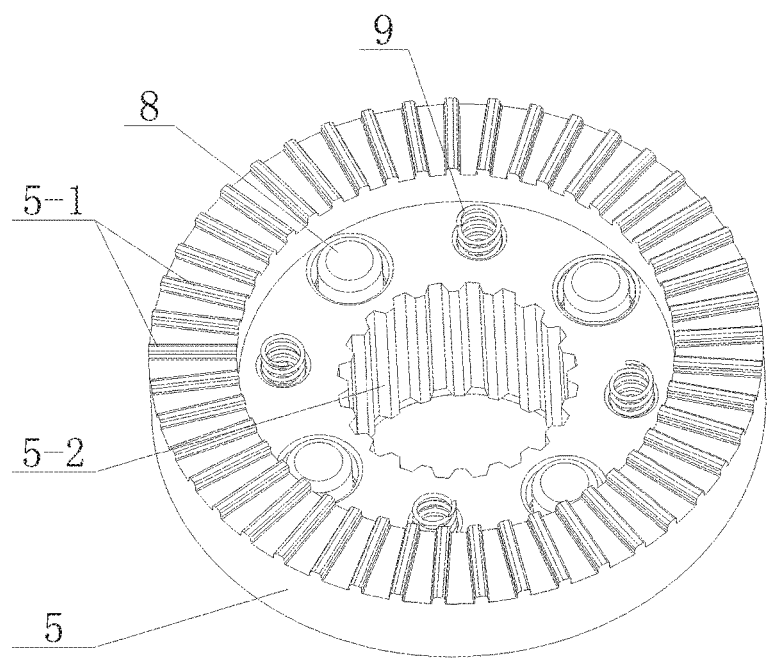
FIG. 3 is a schematic diagram of the structure of the movable gear sleeve of this application.

FIG. 1, FIG. 2 and FIG. 3 show the first embodiment of this application. In the present embodiment, the electromagnetic dog clutch comprises a movable gear sleeve 5 and a fixed toothed sleeve 2 that are engaged to transmit power.

The movable gear sleeve 5 is provided with contrate transmission teeth 5-1; the fixed toothed sleeve 2 is correspondingly provided with contrate tooth spaces 2-1. The transmission teeth 5-1 have a uniform thickness in the direction of tooth length. The tooth spaces 2-1 that engage with the transmission teeth 5-1 have a sector-shape in the direction of tooth space length, that is, two sides of the tooth spaces 2-1 have a preset angle, and the width gradually increases outwardly along the radial direction of the fixed toothed sleeve 2 and gradually decreases inwardly along the radial direction of the fixed toothed sleeve 2.

By employing the engagement of transmission teeth of uniform thickness and sector-shaped tooth spaces, the transmission teeth can more easily engage with the tooth spaces, and more easily realize surface contact, which facilities moment transmission and facilities the stability of the transmission structure.

Alternatively, the movable gear sleeve 5 is provided with sector-shaped contrate tooth spaces, and the fixed toothed sleeve 2 is provided with contrate transmission teeth correspondingly. This is an equivalent structure.

Figure 5A:
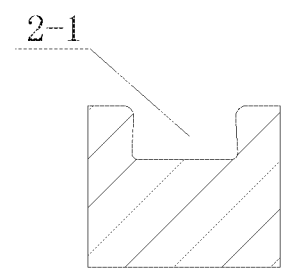
FIG. 5a is the first schematic diagram of the tooth shape of the inverted-cone-shaped tooth of the fixed toothed sleeve and the movable gear sleeve of this application.
Figure 5B:
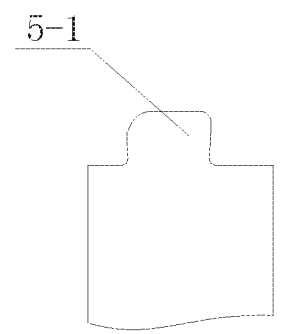
FIG. 5b is the second schematic diagram of the tooth shape of the inverted-cone-shaped tooth of the fixed toothed sleeve and the movable gear sleeve of this application.
Figure 6:
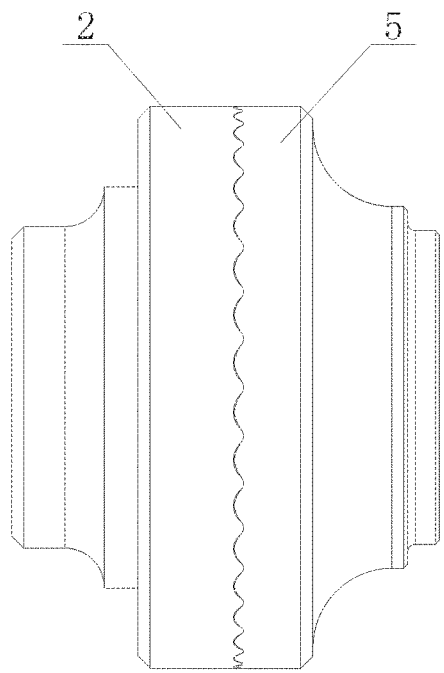
FIG. 6 is a schematic diagram of the tooth shape of the circular-arc-shaped tooth of the fixed toothed sleeve and the movable gear sleeve of this application.
Figure 7:
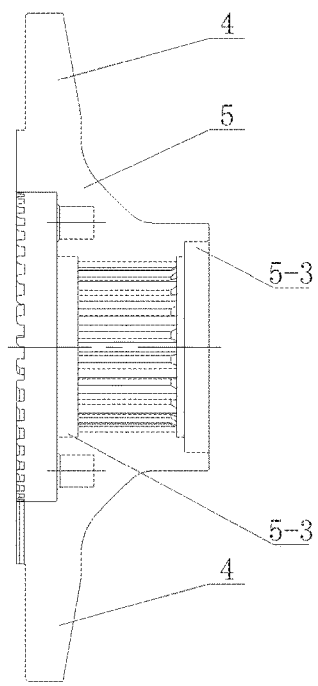
FIG. 7 is a schematic diagram of the overall structures of the armature and the movable gear sleeve of this application.

The transmission teeth 5-1 are rectangular teeth (shown in FIG. 4*a*), inverted-cone-shaped teeth (shown in FIG. 5*a*), trapezoidal teeth, triangular teeth or circular-arc-shaped teeth (shown in FIG. 6); correspondingly, the tooth spaces 2-1 are rectangular tooth spaces (shown in FIG. 4*b*), inverted-cone-shaped teeth spaces (shown in FIG. 5*b*), trapezoidal teeth spaces, triangular teeth spaces or circular-arc-shaped teeth spaces (shown in FIG. 6).

Figure 4A:
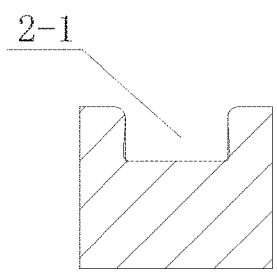
FIG. 4a is the first schematic diagram of the tooth shape of the straight tooth of the fixed toothed sleeve and the movable gear sleeve of this application.
Figure 4B:
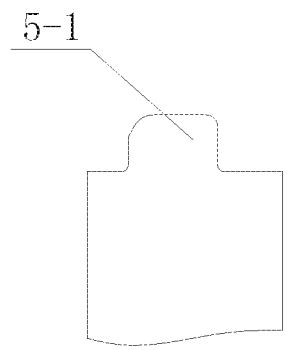
FIG. 4b is the second schematic diagram of the tooth shape of the straight tooth of the fixed toothed sleeve and the movable gear sleeve of this application.

When the transmission teeth 5-1 are rectangular teeth, inverted-cone-shaped teeth or trapezoidal teeth, two sides of a tooth crest are configured to be a fillet, and the fillet radius in the reverse rotation direction of the movable gear sleeve 5 or the fixed toothed sleeve 2 is greater than the fillet radius in the positive rotation direction, as shown in FIGS. 4*a* and 5*a*.

The positive rotation refers to the usual rotation direction of the clutch; for example, when a moment is outputted in this direction the vehicle is moving forward. The reverse rotation refers to the uncommon rotation direction of the clutch; for example, when a moment is outputted in this direction the vehicle is moving backward.

The two sides of the tooth crest of the transmission teeth 5-1 are provided with unequal fillets, especially fillets of big radiuses, mainly in order to facilitate the transmission teeth 5-1 easily entering the tooth spaces 2-1. As the fillet of bigger radius is provided in the uncommon rotation direction of the clutch, the influence on the moment transmission of the clutch is negligibly small.

As shown in FIG. 1, the movable gear sleeve 5 is nested on a power output shaft 7, and they transmit power through a spline group. As shown in FIG. 3, the middle of the movable gear sleeve 5 is provided with an internal spline 5-2, and correspondingly the power output shaft 7 is provided with an external spline, and the movable gear sleeve 5 reciprocating moves on the spline in the axis direction of the power output shaft 7.

The movable gear sleeve 5 may be centered by a spline group or other equivalent structures that transmit torque, to maintain coaxial with the power output shaft 7. If space allowed in the structure, the following structure of centering sleeve 10 may also be employed.

In order to ensure the coaxality between the movable gear sleeve 5 and the power output shaft 7, at the two ends of the spline group, a centering sleeve 10 is provided between the movable gear sleeve 5 and the power output shaft 7. The centering sleeve 10 is made of copper alloy material, has a rectangular cross-section, is positioned with respect to the movable gear sleeve 5 with an interference fit, is clearance fitted with the power output shaft 7, and supports the movable gear sleeve 5 to slide on the power output shaft 7.

The centering sleeve 10 is made of copper alloy material such as tin bronze or graphite-brass composite, and has good wear resistance and deformation resistance. The centering sleeve 10 is positioned with respect to the movable gear sleeve 5 with an interference fit, more specially, tight fit can be achieved by thermal expansion and cold contraction, and the power output shaft 7 is correspondingly provided with a step to limit the centering sleeve 10. The movable gear sleeve 5 is provided with snap slots 5-3 at the two ends of the internal spline 5-2 to fit with the centering sleeve 10.

As shown in FIG. 1, a limiting plate 6 is fixed at one end of the power output shaft 7 where the movable gear sleeve 5 is mounted; a damping mechanism is provided between the limiting plate 6 and the movable gear sleeve 5. The damping mechanism absorbs shock and reduces noise when the limiting plate 6 and the movable gear sleeve 5 collide.

As shown in FIG. 3, several blind holes are provided on the fitting surfaces between the movable gear sleeve 5 and the limiting plate 6; rubber columns 8 are installed in the blind holes and protrude from the blind holes. The rubber columns 8 constitute the damping mechanism.

Alternatively, several blind holes and rubber columns may be both provided on the fitting surface of the limiting plate 6, and the rubber columns protrude out of the blind holes.

Further alternatively, a rubber gasket 11 is provided on the fitting surfaces between the movable gear sleeve 5 and the limiting plate 6, and the rubber gasket 11 constitutes the damping mechanism. The rubber gasket 11 may be provided on the fitting surface of the movable gear sleeve 5 or of the limiting plate 6.

The fixed toothed sleeve 2 is circumferentially provided with an electromagnet 3, correspondingly the movable gear sleeve 5 is circumferentially provided with an armature 4, and the armature 4 and the movable gear sleeve 5 may be manufactured integrally. After the movable gear sleeve 5 engages with the fixed toothed sleeve 2, the electromagnet 3 and the armature 4 do not contact, and have a gap there between.

Second Embodiment

Figure 8:
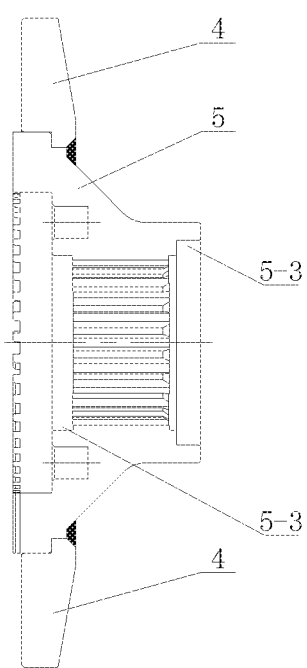
FIG. 8 is a schematic diagram of the welded structure of the armature and the movable gear sleeve of this Application.
Figure 9:
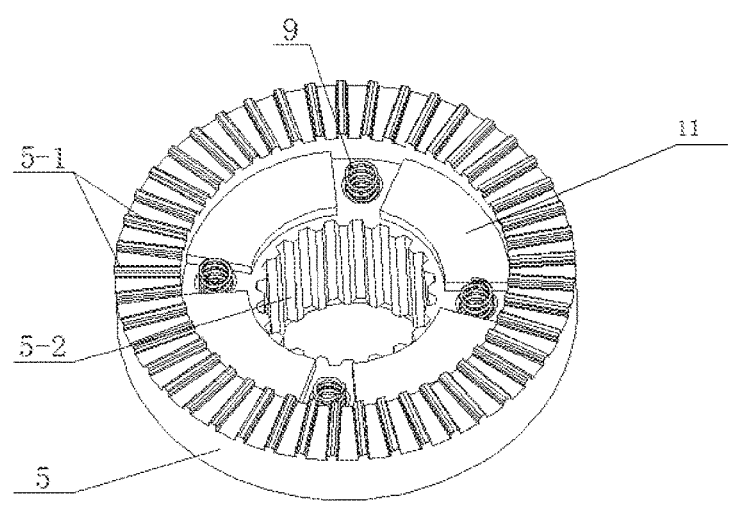
FIG. 9 is a schematic diagram of the structure of the movable gear sleeve of FIG. 3 fitted with a plurality of rubber gaskets.

The second embodiment of this application is shown in FIG. 8. In the present embodiment, the armature 4 and the movable gear sleeve 5 are manufactured separately and then combined.

After the armature 4 and the movable gear sleeve 5 are manufactured separately, they may be combined by welding or by bolt, or the combination of a bolt and welding. The armature 4 is made of No. 10 steel. No. 10 steel (Chinese standards) is sensitive to magnetism.

The above descriptions are merely preferable embodiments of this application, and are not used to limit the protection scope of this application. Any modifications, equivalent substitutions or improvements that are made within the spirit and principle of this application are all included in the protection scope of this application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplar) embodiment without departing from the scope of the invention as set forth in the appended claims and their legal equivalents.

What is claimed is:

1. An electromagnetic dog clutch, comprising a movable gear sleeve and a fixed toothed sleeve that are engaged to transmit power, the movable gear sleeve is provided with contrate transmission teeth, and the fixed toothed sleeve is correspondingly provided with contrate tooth spaces, wherein the contrate transmission teeth have a uniform thickness in a direction of tooth length, the contrate tooth spaces that engage with the contrate transmission teeth have a sector-shape in a direction of tooth space length, and the width of two sides of the contrate tooth spaces gradually increases outwardly along the radial direction of the fixed toothed sleeve and gradually decreases inwardly along the radial direction of the fixed toothed sleeve;

the movable gear sleeve has a center hole, a power output shaft cross the center hole, so the movable gear sleeve is nested on the power output shaft, the movable gear sleeve transmit power to the output shaft through a spline group, and the movable gear sleeve reciprocating moves on the spline group in an axis direction of the power output shaft;

at two ends of the spline group, a centering sleeve is provided between the movable gear sleeve and the power output shaft; the centering sleeve is made of copper alloy material, has a rectangular cross-section, is positioned with respect to the movable gear sleeve with an interference fit, is clearance fitted with the power output shaft, and supports the movable gear sleeve to slide on the power output shaft.

2. The electromagnetic dog clutch according to claim 1, wherein when cutting the contrate transmission teeth along the direction perpendicular to the radius, obtain a cross section, the cross section of the contrate transmission teeth are rectangular teeth, inverted-cone-shaped teeth, trapezoidal teeth, triangular teeth or circular-arc-shaped teeth, and correspondingly, when cutting the contrate tooth spaces along the direction perpendicular to the radius, obtain a cross section, the cross section of the contrate tooth spaces are rectangular tooth spaces, inverted-cone-shaped teeth spaces, trapezoidal teeth spaces, triangular teeth spaces or circular-arc-shaped teeth spaces.

3. The electromagnetic dog clutch according to claim 2, wherein when the contrate transmission teeth are rectangular teeth, inverted-cone-shaped teeth or trapezoidal teeth, two sides of a tooth crest are configured to be a fillet, and the fillet radius in a reverse rotation direction of the movable gear sleeve or the fixed toothed sleeve is greater than the fillet radius in a positive rotation direction.

4. The electromagnetic dog clutch according to claim 1, wherein a limiting plate is fixed at one end of the power output shaft where the movable gear sleeve is amounted, a damping mechanism is provided between the limiting plate and the movable gear sleeve, and the damping mechanism absorbs shock and reduces noise when the limiting plate and the movable gear sleeve collide.

5. The electromagnetic dog clutch according to claim 4, wherein several blind holes are provided on fitting surfaces between the movable gear sleeve and the limiting plate, rubber columns are installed in the blind holes, the rubber columns protrude from the blind holes and constitute the damping mechanism.

6. The electromagnetic dog clutch according to claim 4, wherein a rubber gasket is provided on fitting surfaces between the movable gear sleeve and the limiting plate, and the rubber gasket constitutes the damping mechanism.

7. The electromagnetic dog clutch according to claim 1, wherein the fixed toothed sleeve is circumferentially provided with an electromagnet, and correspondingly the movable gear sleeve is circumferentially provided with an armature; the armature and the movable gear sleeve are manufactured integrally, or manufactured separately and then combined.

8. The electromagnetic dog clutch according to claim 7, wherein the armature and the movable gear sleeve are manufactured separately and then combined by welding or using a bolt, and the armature is made of No. 10 steel, No. 10 steel is measured under the Chinese standard.

9. An electromagnetic dog clutch, comprising a movable gear sleeve and a fixed toothed sleeve that are engaged to transmit power, the movable gear sleeve is provided with contrate tooth spaces, and the fixed toothed sleeve is correspondingly provided with contrate transmission teeth, wherein the contrate transmission teeth have a uniform thickness in a direction of tooth length, the contrate tooth spaces that engage with the contrate transmission teeth have a sector-shape in a direction of tooth space length, and the width of two sides of the contrate tooth spaces gradually increases outwardly along the radial direction of the movable gear sleeve and gradually decreases inwardly along the radial direction of the movable gear sleeve;

the movable gear sleeve has a center hole, a power output shaft cross the center hole, so the movable gear sleeve is nested on the power output shaft, the movable gear sleeve transmit power to the output shaft through a spline group, and the movable gear sleeve reciprocating moves on the spline group in an axis direction of the power output shaft;

at two ends of the spline group, a centering sleeve is provided between the movable gear sleeve and the power output shaft; the centering sleeve is made of copper alloy material, has a rectangular cross-section, is positioned with respect to the movable gear sleeve with an interference fit, is clearance fitted with the power output shaft, and supports the movable gear sleeve to slide on the power output shaft.

* * * * *